Dec. 1, 1925.

V. G. APPLE
ELECTRIC MOTOR
Filed July 8, 1921

Inventor:
Vincent. G. Apple.
By Toulmin Rain Hinkle
Attys

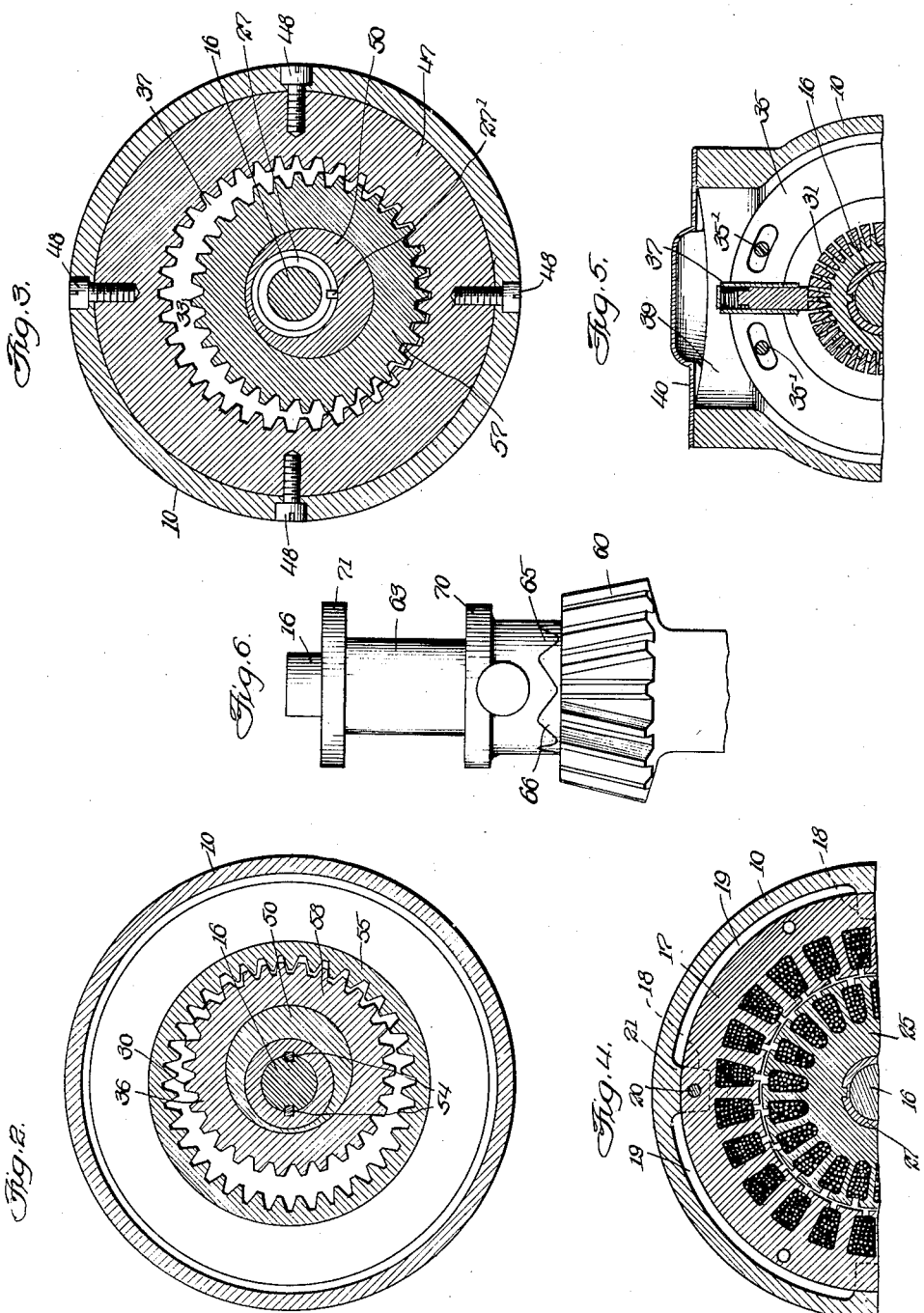

Patented Dec. 1, 1925.

1,563,945

UNITED STATES PATENT OFFICE.

VINCENT G. APPLE, OF DAYTON, OHIO.

ELECTRIC MOTOR.

Application filed July 8, 1921. Serial No. 483,255.

*To all whom it may concern:*

Be it known that I, VINCENT G. APPLE, a citizen of the United States, residing at Dayton, in the county of Montgomery and State of Ohio, have invented certain new and useful Improvements in Electric Motors, of which the following is a specification.

This invention relates to improvements in electric motors.

One of the objects of the invention is to improve electric motors.

Another object is to reduce the cost of construction of electric motors.

Another object is the provision of means for ventilating the field and armature or stator and rotor of electric motors by a forced draft of air produced by a fan within the motor casing, and which may be utilized to blow the dust from the commutator out from the casing.

Another object is to provide an electric motor that is self contained and which may be mounted at any point on an independently continuous shaft.

Another object is to provide in the electric motor casing a speed changing train of gearing to be connected between the armature and the insertable shaft, upon which the motor may be mounted, to change the relative speeds of the shafts.

Another object is to provide means to permit the armature to float in its field within the casing without spilling any oil from the bearing, and to relieve it from friction generated by its weight when rotating on a vertical axis.

Another object is to provide a speed changing gearing which may be operated only by the rotation of the armature or rotor and which cannot be operated by rotation of the driving shaft.

Other, further and more specific objects of the invention will become readily apparent, to persons skilled in the art, from a consideration of the following description, when taken in conjunction with the drawings, wherein:—

Fig. 2 is a transverse section taken on line 2—2 of Fig. 1.

Fig. 3 is a transverse section taken on line 3—3 of Fig. 1.

Fig. 4 is a transverse section taken on line 4—4 of Fig. 1.

Fig. 5 is a transverse section taken on line 5—5 of Fig. 1.

Fig. 6 is an elevation of a clutch by means of which the driven shaft may be connected to a gear.

In all the views the same reference characters are employed to indicate similar parts.

Figure 1:
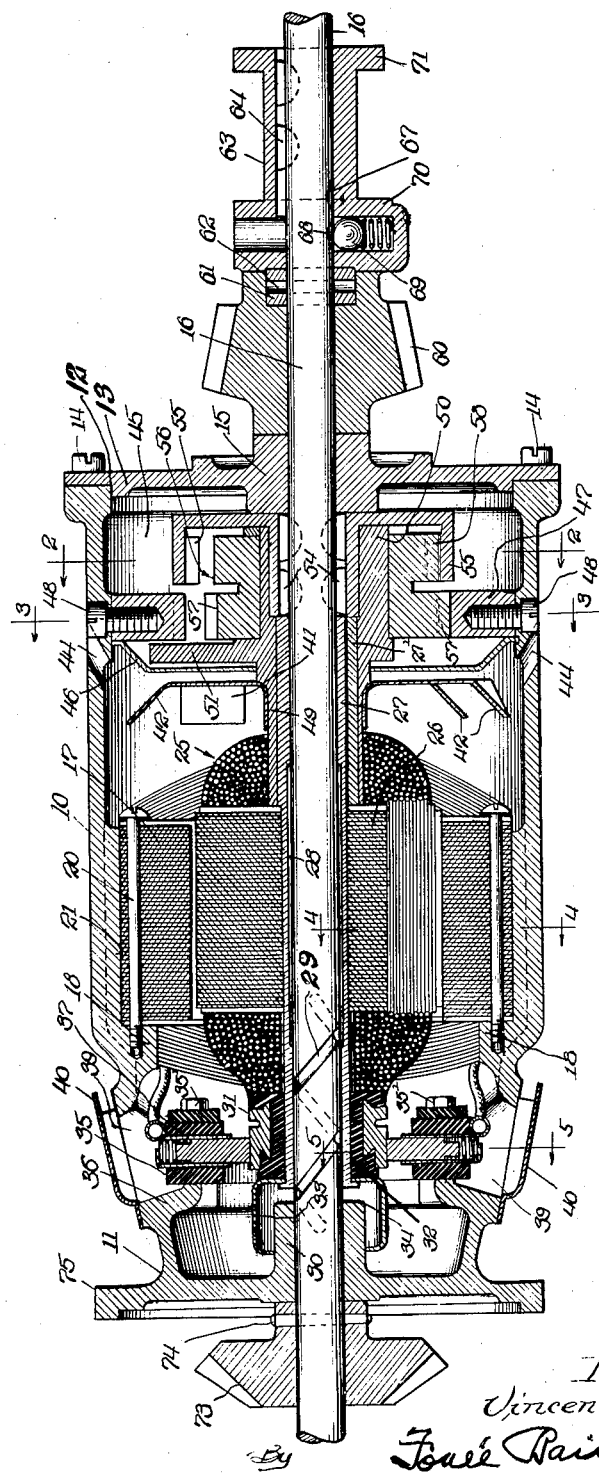
Fig. 1 is a vertical central section of one embodiment of the invention.

In the drawings showing a motor in which my invention is embodied, 10 represents a cylindrical casing closed at the end 11 and open as at 12. The end 12 is to be closed by an end plate closure 13 secured to the casing by screws 14, or the like. The end plate contains a bearing hub 15 for the axial inner shaft 16. The field magnet structure 17 consists of a series of rings suitably cemented together and somewhat smaller in diameter than the interior of the casing, and properly secured to shoulders 18 that are located in spaced apart relation inside of the casing. This leaves segmental air spaces 19 between the interior of the casing 10 and the exterior of the field magnet structure 17, thru which air may be forced to pass from one end of the casing to the other.

The field magnet structure or stator is connected in place by screws 20, which pass thru the structure and into the shoulders 18. Radial shoulders 21 are made at suitable intervals corresponding with the shoulders 18, and the casing is properly bored between the shoulders 21 to receive the rings of the field magnet 17, so as to accurately position the field magnet with reference to the axis of the cylinder casing 10.

An armature 25 rotatable relatively to the field magnet structure 17 may be placed therein. The core 26 of the armature is mounted upon a tubular driving shaft 27 to be rotated by the armature upon the insertable shaft 16. The tubular shaft 27 is counterbored, as at 28, to provide a space within which may be included a lubricating medium for the bearings of the tubular shaft upon the insertable shaft.

A spiral groove 29 may be made in either of the shafts for conveying lubrication from the space 28 to the hub bearing 30 or vice versa by the rotation of either of the shafts.

A commutator 31 is shown to be molded in insulating material 32 and is properly secured to the tubular shaft 27 and to the armature 25. Preferably the insulating material in which the commutator is molded is a continuing part of the insulating material in which the conductors of the armature are submerged.

A cap 33 is connected to the tubular shaft 27 and overlies the end 34 of the hub 30 to catch or hold oil or any that may be thrown out by the centrifugal action of the armature and the shaft upon which it is mounted.

A ring 35 of insulating material is rotatably adjustable upon the support 36 which constitutes a part of the cylindrical frame 10 by screws 35' and this ring supports commutator brush holders 37 that are suitably secured to the ring in any appropriate manner.

The core of the armature 25, it will be noticed, is located slightly one side of the field magnet structure 17 so that when the motor is placed in a vertical position, with the open end 12 down, the tendency of the magnet of the field is to lift the armature, and to cause it to float, more or less, in its lifted position. Thus the weight of the armature, to a large degree, is taken from the bearings which otherwise would receive the lateral downward thrust due to this effect.

Opposite the brushes that bear upon the commutator are openings 39, covered by shield plates 40. The shield plates can conveniently be removed for access to the commutator brushes and thru the openings 39 air is projected for the purpose of cooling the dynamo structure and for blowing out the dust or dirt that might otherwise accumulate from the wear of the commutator and brushes and prevent it from being deposited upon the surrounding conducting surfaces of the structure.

A fan 41 is secured to the tubular shaft 27 and is provided with wings 42 that are properly deflected to draw air into the cylindrical casing 10 thru the openings 44, so that when the armature of the machine is rotated air will be drawn into the casing thru the openings 44, then forced thru the segmental openings 19 around the field magnet, and out of the casing thru the openings 39, thus cooling the armature and the field magnet and forcibly ejecting from the casing all dust or other objectionable matter that may be floating in the air.

A gear casing 45 is included inside of the cylinder 10 and is separated from the armature by a partition 46. An internal gear 47 is secured to the cylindrical casing 10 by screws 48.

A sleeve 49, which terminates in an eccentric collar 50, is secured to the tubular shaft 27 by the key 27' and rotates therewith. The armature in its rotation simply and only rotates the tubular shaft 27 and the eccentric 50. A counterbalance weight 51 is located on the side of the axis opposite to that on which the heavy part of the eccentric 50 is located to compensate for the difference in weight on the two sides of the axis, to balance the eccentric.

Secured to the shaft 16, by Woodruff keys 54, is an internal gear 55. Loosely rotatable on the eccentric 50 is a double intermediate gear member 56 consisting of the connected together gears 57 and 58. As the eccentric 50 is rotated the gears 57 and 58 are kept in mesh at progressively rotatable points, with the gears 47 and 55, respectively, and thus the gear 55 and shaft 16 may be driven at less speed than the armature.

In the present exemplification the gear 57 has thirty-three teeth, and the internal gear 47 has thirty-seven teeth, while the gear member 58 is provided with thirty teeth and the internal gear member 55 has thirty-six teeth; so that when the eccentric 50 is rotated the shaft 16 will be rotated at a materially reduced speed. The rotative power of the armature is transmitted thru the tubular shaft 27, the eccentric 50, the gears 56, 57, 58 and 55, and the relation and arrangement of the gears is such that any power applied to primarily rotate the gear 55 will not rotate the armature 25 in either direction; in other words the gear 55 can only be rotatively driven by the rotation of the eccentric 50, the intervening mechanism operating as a brake to prevent the rotation of the parts after the eccentric has been stopped.

Loosely mounted on the shaft 16 is shown a gear wheel 60 held in place by the collar 61 which is secured to the shaft by a pin 62. An axially movable collar 63 is secured to the shaft 16 by the keys 64 and is provided with a clutch face 65 which engages a similar clutch face 66 on the member 60. The shaft is provided with spaced apart indentations 67 and 68 in which a spring pressed ball 69 moved to hold the axially shiftable collar 63 in selected position so that the shaft 16 may be placed in clutch with the gear wheel 60, or out of engagement therewith depending upon the location of the collar 63.

Between the flanges 70 and 71 of the collar a suitable shifting lever may be introduced for shifting the clutch member so that the gear wheel 60 may be positively connected to the shaft 16 or disconnected therefrom.

A similar gear wheel 73 may be secured directly to the shaft 16 by a pin 74 or otherwise.

When the motor is used with a laundry machine the latter described gear may be employed for rotating the wringer and the gear 60 may be used for oscillating or rotating the member containing the clothes within the tub.

In the operation of the motor described, the field magnet frame 10 should be held stationary while the armature 25 is permitted to rotate. Any sort of means may be secured to the disc 75 for this purpose of rigidly fixing it, or a clutch which permits the gradual slowing up of the field magnet frame may be used in order that the armature may be more gently started with its load.

It is furthermore obvious that if the shaft 16 be held against rotary movement that the casing 10 will be rotated thru the train of gearing described and power may be transmitted from the casing or from the disc 75, which in such case may well be a gear or a pulley.

It is evident that whether the motor described is of the direct or alternating type will have no modifying effect on the invention herein disclosed.

Having described my invention what I claim as new and desire to secure by Letters Patent, is:—

A dynamo electric machine structure comprising a cylinder, a dynamo electric machine in one end of the cylinder, eccentric speed reduction gearing in the other end of the cylinder, a shaft extending entirely through the casing to transmit power from both ends, a tubular shaft upon which the armature of said machine is fixed, rotatable on said extended shaft and extending into said speed reduction gearing, and an eccentric rotated by said extended shaft to operate said gearing in either direction dependent upon the direction of rotation of said extended shaft, but locking against rotation of said tubular shaft by power applied to said extended shaft.

In testimony whereof I hereunto subscribe my name.

VINCENT G. APPLE.